Dec. 23, 1958 G. A. LYON 2,865,683
WHEEL COVER
Filed March 10, 1958 2 Sheets-Sheet 1
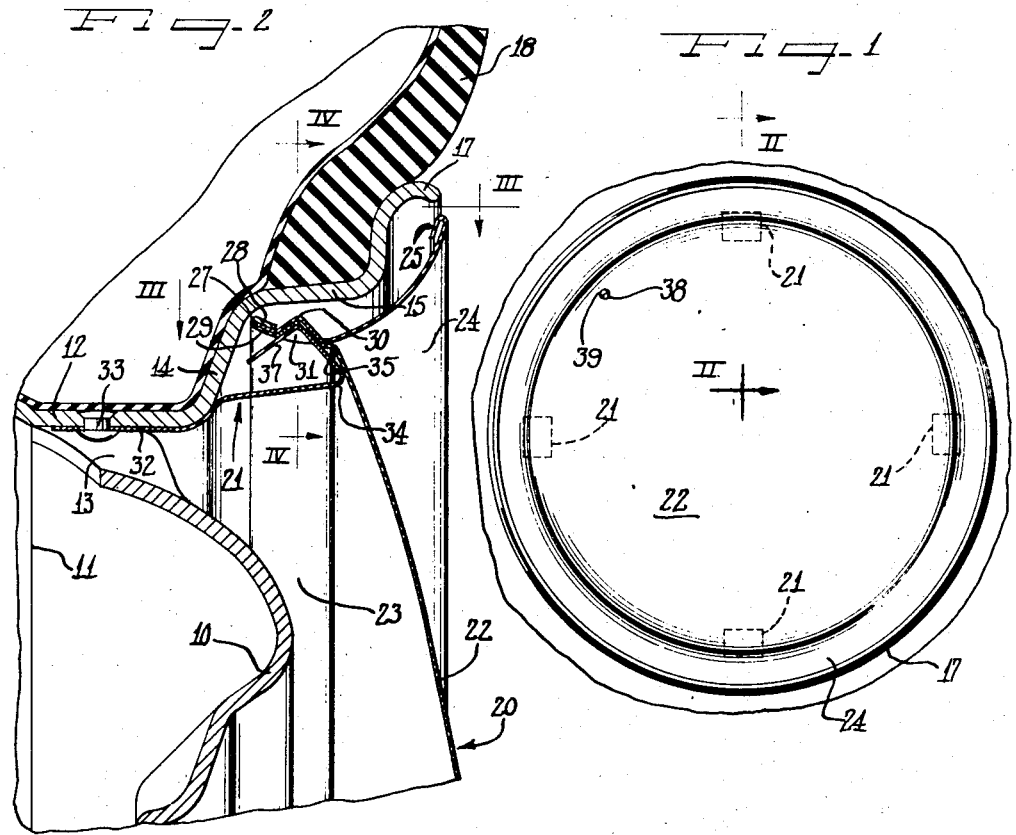
Inventor
George Albert Lyon Dec. 23, 1958 G. A. LYON 2,865,683
WHEEL COVER
Filed March 10, 1958
2 Sheets-Sheet 2
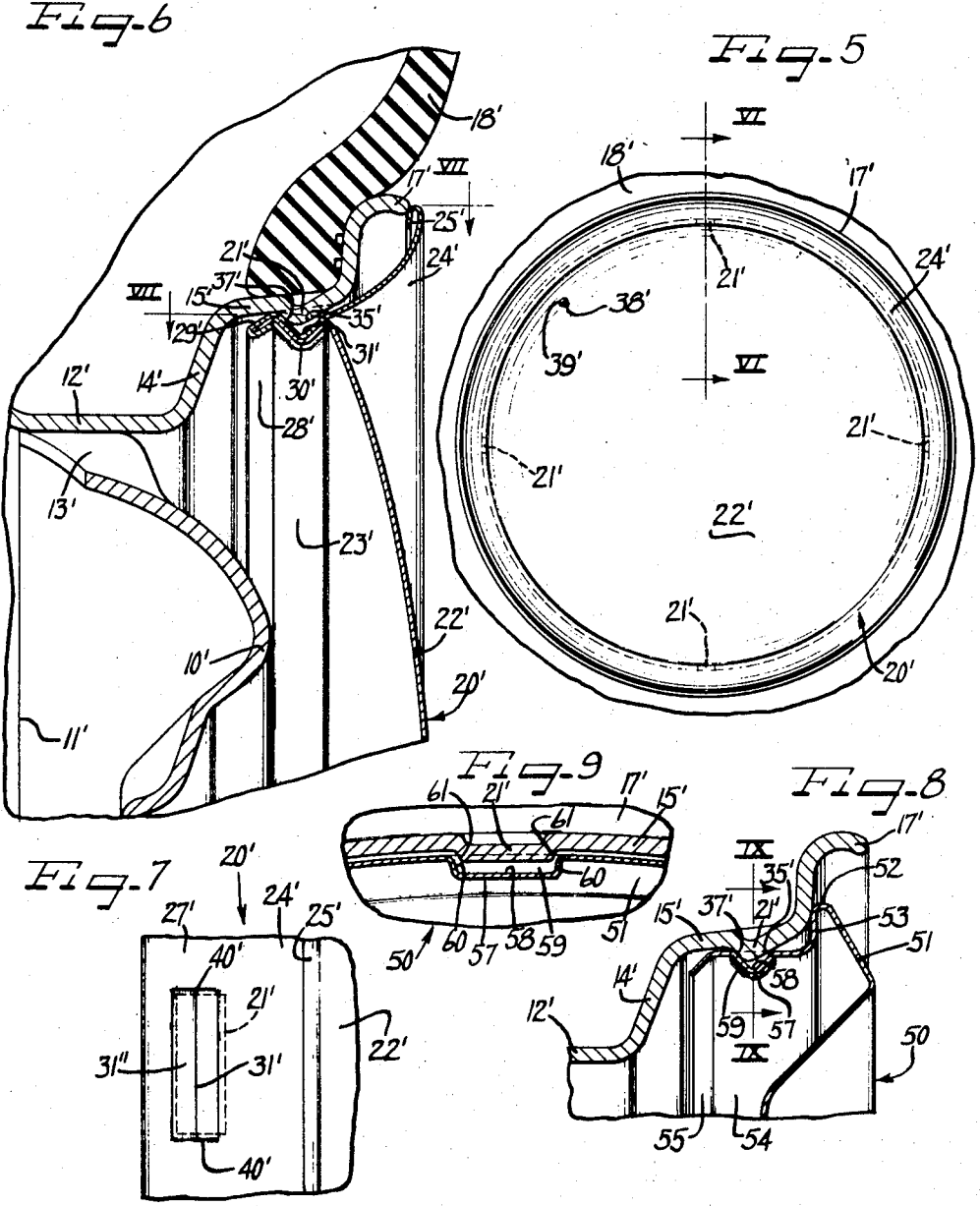
Inventor
George Albert Lyon

United States Patent Office 2,865,683
Patented Dec. 23, 1958

2,865,683

WHEEL COVER

George Albert Lyon, Detroit, Mich.

Application March 10, 1958, Serial No. 720,806

11 Claims. (Cl. 301—37)

The present invention relates to improvements in wheel structures and more particularly concerns the ornamental and protective covering of the outer sides of vehicle wheels.

This application is a continuation-in-part of my co-pending application Serial No. 328,668 filed December 30, 1952, now abandoned, and embodies all of the disclosure of said application plus the disclosure in Figures 5 through 9 to be described hereinafter.

An important object of the present invention is to provide an improved wheel structure having thereon retaining clips and a cover supported by the retaining clips in snap-on, pry-off relation.

Another object of the invention is to provide improved means for retaining the wheel cover on a vehicle wheel.

A further object of the invention is to provide a novel wheel cover for disposition at the outer side of a vehicle wheel and having means cooperative with retaining clips on the wheel in snap-on, pry-off, non-turning relation.

Other objects, features and advantages of the present invention will be readily apparent from the following detailed description of a preferred embodiment thereof taken in conjunction with the accompanying drawing, in which:

Figure 1 is a side elevational view of a wheel structure embodying features of the invention;

Figure 2 is a radial sectional view on an enlarged scale taken substantially on the line II—II of Figure 1;

Figure 3 is a fragmentary detail edge elevational view of the cover taken substantially in the plane of line III—III of Figure 2;

Figure 4 is a fragmentary detail sectional view taken substantially on the line IV—IV of Figure 2;

Figure 5 is an outer side elevational view of a wheel structure embodying a modification;

Figure 6 is an enlarged fragmentary sectional radial detail view taken substantially on the line VI—VI of Figure 5;

Figure 7 is a fragmentary elevational detail view taken substantially along the line VII—VII of Figure 6;

Figure 8 is a fragmentary radial sectional detail view through the wheel structure showing another modification; and Figure 9 is a fragmentary sectional detail view taken substantially on the line IX—IX of Figure 8.

A wheel of the kind involved in the present invention may be of the disk spider type having a disk spider body 10 having an outer marginal flange 11 by which the wheel body is attached to a base flange 12 of a drop center type of tire rim. At suitable intervals, such as four intervals spaced around the perimeter of the wheel body, the attachment flange 11 is inset to afford wheel openings 13. The tire rim has an outer side flange 14 merging with an intermediate flange 15 leading into a terminal flange 17. The arrangement of the flanges is such as to support a pneumatic tire and tube assembly 18.

A wheel cover 20 is provided for disposition at the outer side of the wheel, and the wheel has thereon retaining spring clips 21 for retaining the cover on the wheel.

According to the present invention, the cover 20 is proportioned to cover the wheel body 10 and substantially cover the tire rim. For this purpose the cover comprises a central crown or body plate 22 having a marginal preferably generally axially inwardly extending annular flange 23 of a diameter to fit in spaced generally telescoped relation within the intermediate flange 15 of the tire rim. Preferably carried by the marginal flange 23 is an annular trim ring portion 24 which has its outer margin provided with an underturned reinforcing and finishing flange 25. The annular trim portion 24 extends generally radially and axially inwardly so as to overlie the tire rim in spaced relation and has an annular generally axially inwardly extending inner marginal flange 27 which is formed complementary to and is disposed in telescoped assembled relation with the peripheral flange 23 of the inner cover member. For securing the cover members together, the flange 23 is provided with a return-bent reinforcing and clamping flange 28 engaging the terminal portion of the flange 27 and thereby retaining the cover members assembled. From Figure 2 it will be observed that at least the axially inner portion of the combined flanges is directed generally radially outwardly as well as axially inwardly obliquely so as to provide an inner marginal internal cam surface 29.

For retaining engagement with the spring clips 21, the telescoped flanges 23 and 27 are provided at suitable intervals with radially outwardly projecting embossments 30 defining respective pockets 31 opening radially inwardly and preferably of generally V-shape cross-section transversely of the flanges. There are as many of the pockets as there are retaining clips 21 and in a suitable arrangement there are four of the pockets 31 and four of the clips 21 disposed at equal intervals such as at the four wheel openings 13.

The clips 21 are constructed to be secured to the tire rim at the wheel openings and for this purpose each of the clips has a body or base flange 32 secured as by means of a rivet 33 to the inner side of the base flange 12 within the respective wheel openings 13 and preferably centered in a circumferential sense within the opening. Extending from the base flange 32 is a generally gooseneck loop portion 34 extending generally axially outwardly overlying the side flange 14 of the tire rim. The gooseneck loop portion 34 of the spring clip includes a generally radially outwardly and axially inwardly extending head flange 35 and an angular generally axially inwardly and radially directed terminal flange 37. The head flange 35 provides a shoulder which is adapted to cam inwardly along the cam terminal portion 29 of the combined flanges of the cover members and snap into the respective pocket 31 as an incident to axially inward pressure upon the cover during assembly of the cover with the wheel. The angle provided at juncture of the flanges 35 and 37 of the clip snaps into the complementary pocket 31 as defined by the embossment 30, with the flange 35 shouldering against the axially outer side of the pocket while the flange 37 shoulders against the axially inner side of the pocket. By preference the construction and arrangement is such that the cover is wholly supported by the clips 21 in floating relation to the wheel.

In applying the cover to the wheel, a registering relation of the several pockets 31 in the flanges of the cover structure is effected by registering a valve stem 38 from the tire and tube assembly within a valve stem aperture 39 in the cover member 22, and then pressing inwardly on the cover to snap the clips 21 into the pockets 31.

When the cover is on the wheel, it is very effectively held against not only axial displacement, but also against torsional or rotary displacement. The latter result is attained by virtue of the end walls identified at 40 defining the pockets 31 (Figs. 2 and 4) cooperating with the sides of the spring retaining clips 21.

Inasmuch as the cover is floatingly supported by the retaining clips 21, there may be tendency of the cover during road shocks or the like to displace diametrically. However, such diametrical displacement is limited to very close range, avoiding any strain upon the retaining clips, by the close but normally spaced opposition of portions of the axial flange structure of the cover to the intermediate flange 15. Such portions comprise the tip portion 28 of the flange assembly or the tips of the radially outwardly projecting embossments 30, or both. Initially during any diametrical displacement of the cover, the generally radially outwardly projecting tip of the flange would, of course, make contact with the adjacent axially inner portion of the intermediate flange 15, but should the diametrical force be great enough to cause some rocking tendency of the cover in addition to the diametrical movement, the tips of the adjacent embossments will stoppingly engage the intermediate flange.

To remove the cover from the wheel, a pry-off tool may be inserted between the annular outer cover member 24 and the tire rim and pry-off force applied to the cover, after initial axially outward stressing of the cover by means of the pry-off tool, the tip of the pry-off tool can be inserted at the axially inner side of one of the embossments 30 providing a pry-off shoulder to complete the pry-off. On the other hand, if desired, the tip of the pry-off tool can be inserted behind the multi-reinforced inner extremity of the multiple flange behind the cover assembly to exert the final pry-off leverage.

Principles of the generic concept of the present invention are also readily applicable to wheel structures especially adapted for tubeless tires wherein the tire rim provides part of the inflation chamber for the tire and must therefore be quite free from any possibility of leakage from such chamber. More especially, use of attaching means such as the rivets 33 shown in Figure 2 for attaching the spring clips 21 may be desirably avoided for tubeless tire purposes by the modification shown in Figures 5, 6 and 7 wherein a cover 20' generally similar to the cover 20 is constructed and arranged to be applied in press-on, pry-off relation over the outer side of a vehicle wheel which is in general the same as the wheel in Figure 2, with identical parts identified by primed similar reference numerals. The multi-flange, drop center tire rim supports a tubeless pneumatic tire 18'.

For retaining the cover 20' in press-on, pry-off relation over the outer side of the wheel, the tire rim intermediate flange 15' is provided in the axially outer portion thereof and in a relationship to be sealingly over-lapped by the bead of the tire 18', with integral cover-retaining shoulder means in the form of integral generally radially inwardly pressed cover retaining bumps 21' disposed in equidistantly circumferentially spaced relation such as at four places on the intermediate flange. Each of the bumps 21' provides on its axially outer side a lead-in or cam surface 35'. On its axially inner side, the retaining bump 21' in each instance is provided with an angular generally axially inwardly and radially directed shoulder 37'.

The cover 20' includes a central crown or body plate 22' having a generally axially inwardly extending marginal continuous annular flange 23' of a diameter to fit in generally telescoped relation within the intermediate flange 15' of the tire rim. Carried by the marginal flange 23' is an annular trim ring portion 24' which has its outer margin provided with an underturned reinforcing and finishing flange 25' which is adapted in this instance to engage in bottomed axial inward cover limiting relation against the tip of the terminal flange 17' of the tire rim. At its axially inner margin, the cover member 24' is provided with an annular continuous generally axially inwardly extending flange portion 27' which is formed complementary to and is disposed in telescoped assembled relation with the flange 23' of the inner cover member 22'. The flanges 23' and 27' are secured together by a return-bent reinforcing and clamping flange 28' to thus provide a combined continuous annular generally axially extending flange portion behind the cover. The axially inner portion or extremity of the combined flanges is directed generally radially inwardly as well as axially inwardly obliquely so as to provide an inner marginal cam surface 29'.

In applying the cover 20' to the outer side of the wheel, a valve stem 38' is registered with a valve stem aperture 39' in the cover plate 22' and a plurality of radially outwardly opening pocket-like sockets 31' in the combined flange 23'—27' defined by respective radially inwardly projecting embossments 30' are registered with the several retaining bumps 21'. Since the diameter of the radially outer face of the cover flange portion 27' is slightly greater than the diameter described about the tips of the retaining bumps 21', axially inward pressure applied to the cover during application thereof to the wheel causes the cam surface 29' to cam axially inwardly on the shoulder cam surface 35' of the retaining bump associated with each of the sockets 31', with radially inward resilient flexure of the cover flange until the tips of the retaining bumps are passed and the bumps snap into the sockets 31'. It will be understood, of course, that the material of the cover members 22' and 24' is of sufficiently thin stock so that in the laminar flange arrangement there is substantial resilient flexibility. Stainless steel, brass, or aluminum alloy stock of suitable grade may be used in the cover. As illustrated, of course, the thickness of the material is highly exaggerated.

As best seen in Figs. 6 and 7, the respective sockets 31' are of generally V-shape cross-section transversely of the flanges 23', 27' to receive the respective retaining bumps 21' therein. Each of the sockets 31' is provided on its axially inner side with a generally axially outwardly facing substantially straight shoulder 31" of slightly greater circumferential width than the corresponding retaining shoulder 37' of the retaining bump and engageable with the bump shoulder under resiliently tensioned engagement when the cover is on the wheel. The relationship of circumferential width of the socket shoulder 31" to the shoulder of the retaining bump 21' is shown in Figure 7 wherein the retaining bump has been superimposed in phantom outline for illustrative purposes. At the opposite circumferential sides of the socket 31' are provided respective opposed circumferentially facing shoulders 40' that oppose the respective adjacent sides of the retaining bump and in normally slightly spaced relation but interengageable therewith on tendency of turning of the cover on the wheel to retain the cover against such turning.

To remove the cover 20' from the wheel, a pry-off tool such as a screwdriver may be inserted behind the outer turned marginal edge flange 25' and pry-off force exerted axially outwardly to snap the retaining shoulders 31" from the bump shoulders 37'.

In the modification of Figures 8 and 9, details of the wheel are identical with the wheel of Figures 5 and 6 and identical reference numerals therefore identify identical parts. In this form of the invention, a cover 50 has an annular radially outer marginal portion 51 provided with a turned edge 52 adapted to overlie and engage the terminal flange 17' of the tire rim, in this instance adjacent juncture with the intermediate flange 15'. In this instance, the cover 50 is provided behind the outer marginal portion 51 with cover retaining means embodying substantially the same sort of flange and socket structure for press-on, pry-off retaining engagement with the retaining bumps 21' as on the cover 20' but modified by being a one-piece flange rather than a double flange as in the covers 20 and 20' and as though the trim portions 24 and 24' of the previously described covers were omitted. To this end, the cover 50 has extending generally radially inwardly from the turned edge 52 a continuous annular flange portion 53 which may be integral in one piece as shown or may comprise an attached flange if preferred. Extending axially inwardly from the flange portion 53 is a continuous annular flange portion 54 of a diameter to telescope in slightly spaced relation within the tire rim intermediate flange 15' but of a larger diameter than the diameter described about the tips of the retaining bumps 21'. The width of the flange portions 54 behind the cover 50 is sufficient to extend substantially axially inwardly beyond the retaining bump shoulders 37' and with an axially inner annular extremity terminal flange 55 angularly turned generally radially and axially inwardly and affording a lead-in cam surface corresponding to the similar lead-in cam flange surface 29 and 29' of the covers 20 and 20'.

At circumferentially spaced intervals corresponding to the spacing of the retaining bumps 21', the continuous annular resilient flange 54 is provided with generally radially inwardly projecting embossments 57 providing bump-receiving pocket-like sockets 58 of generally V-shape cross-section transversely of the flange 54. At the axially inner side of each of the sockets 58, a radially and axially outwardly facing substantially straight shoulder 59 is provided of a width slightly greater than the width of the opposing substantially flat bump shoulder 37' of substantial circumferential width. At the opposite circumferential sides of the socket 58, respective opposed generally circumferentially facing turn-preventing shoulders 60 are provided which are sufficiently spaced to afford ample tolerance clearance but are engageable with respective opposed shoulders 61 at the sides of the retaining bump 21' for holding the cover against turning relative to the wheel.

It will be understood that modifications and variations may be effected without departing from the scope of the novel concepts of the present invention.

I claim as my invention:

1. In a wheel structure including a tire rim part and a body part with one of said parts having thereon a plurality of axially outwardly extending gooseneck retaining spring clips provided with heads directed generally radially outwardly, a cover for disposition at the outer side of the wheel having a generally axially inwardly directed flange therebehind, said flange having clip receiving pockets therein retainingly receptive of the gooseneck heads of the retaining clips, said pockets being defined by generally radially outwardly projecting embossments in the flange engageable by a pry-off tool for removing the cover from the wheel.

2. In a cover for disposition at the outer side of a vehicle wheel, a circular cover member having a generally axially extending flange, a second circular cover member having a flange telescoped with the flange of the first mentioned cover member, the telescoped flanges having registering internested complementary embossments therein providing radially opening clip receiving pockets.

3. In a cover for disposition at the outer side of a vehicle wheel, a circular cover member having a generally axially extending flange, a second circular cover member having a flange telescoped with the flange of the first mentioned cover member, the telescoped flanges having registering internested complementary embossments therein providing radially opening clip receiving pockets, said flanges having a lead-in cam surface at their extremity portion leading into said pockets.

4. In a wheel structure including a tire rim part and a wheel body part with one of said parts having thereon a plurality of fixedly secured and axially outwardly extending gooseneck retaining spring clips provided with heads directed generally radially, a cover for disposition at the outer side of the wheel having a generally axially inwardly directed flange therebehind, said flange having clip receiving pockets therein receptive of the gooseneck heads of the retaining clips and providing generally axially outwardly facing shoulders retainingly engageable by the clip heads, said pockets having circumferentially facing shoulders opposing the sides of the clip heads to hold the cover against turning on the wheel.

5. In a wheel structure including a tire rim part and a body part with one of said parts having thereon a plurality of axially outwardly extending gooseneck retaining spring clips provided with heads directed generally radially and having generally axially inwardly sloping head flanges, a cover for disposition at the outer side of the wheel having a generally axially inwardly directed flange therebehind, said flange having clip receiving sockets therein retainingly receptive of the gooseneck heads of the retaining clips, said cover flange having a lead-in cam surface at its inner extremity turned generally radially in the same direction as said clip heads and sloping generally axially inwardly and leading into the sockets to facilitate camming of the clip heads into the sockets during pressing of the cover into position on the wheel, said sockets being defined at the axially inner sides thereof by generally axially outwardly facing shoulders retaining engageable by the clip heads after the lead-in cam surface extremity of the flange has been pressed past said head flanges of the clips.

6. In a wheel structure including a tire rim having an intermediate generally axially extending flange and cover retaining spring clips carried by the wheel and having cover retaining heads disposed adjacent to but spaced radially inwardly from the intermediate flange, a cover for disposition at the outer side of the wheel and having a radially outer portion for overlying the tire rim, with a flange structure on the cover disposed generally radially and axially inwardly from the radially outer extremity of said outer cover portion and arranged for generally telescoped disposition relative to the intermediate flange and radially outwardly adjacent to the clip heads, said flange structure having respective sockets therein provided with axially spaced shoulders engageable with complementary opposing generally axially facing shoulders of the clip heads for generally floating support and retention of the cover on the wheel by the interengagement of the clip and flange structure shoulders, said flange structure having portions directed generally toward the intermediate flange but normally spaced therefrom in close adjacency but engageable with the intermediate flange on diametrical displacement of the cover by road shocks or the like, whereby to avoid straining of the cover supporting and retaining clips by limiting to a narrow range the diametrical displacement of the cover.

7. In a wheel structure including cover retaining shoulder means providing generally axially inwardly facing circumferentially spaced cover retaining shoulders of substantial circumferential width and radial extent and being substantially circumferentially straight, a cover for disposition at the outer side of the wheel and having therebehind a continuous annular generally axially extending flange portion, said flange portion having a circumferential series of spaced sockets matching said cover retaining shoulders of the wheel and provided with generally axially outwardly facing substantially straight shoulders of slightly greater circumferential width than said wheel means retaining shoulders and interengageable therewith for retaining the cover on the wheel in press-on, pry-off relation, said sockets having at the opposite circumferential sides thereof shoulders that oppose the respective adjacent sides of the cover retaining means on the wheel in normally slightly spaced relation but interengageable therewith on tendency of turning of the cover on the wheel to retain the cover against such turning.

8. In a wheel structure as defined in claim 7, said axially extending flange portion of the cover having at the axially inner sides of the sockets and leading to the socket shoulders axially inner marginal cam surface to facilitate camming of said retaining shoulder means into engagement of the retaining shoulders thereof with the socket shoulders.

9. In a wheel structure as defined in claim 7, said cover flange being of rigid structure and said retaining shoulder means of the wheel structure comprising resilient spring clips.

10. In a wheel structure as defined in claim 7, said sockets comprising embossments of generally V-shape cross-section transversely of said cover flange to accommodate the retaining shoulder means therein.

11. In a wheel structure including cover retaining shoulder means providing generally axially inwardly facing circumferentially spaced cover retaining shoulders of substantial circumferential width and radial extent and being substantially circumferentially straight, a cover for disposition at the outer side of the wheel and having therebehind a continuous annular generally axially extending flange portion, said flange portion having an axially inner annular extremity flange structure directed generally radially for camming over and past said retaining shoulder means and also having axially outwardly adjacent to said annular extremity flange structure retaining shoulder means matching said cover retaining shoulders of the wheel and providing generally axially outwardly facing substantially straight shoulders of greater circumferential width than said wheel means retaining shoulders and interengageable therewith for retaining the cover on the wheel in press-on, pry-off relation, at least one of said straight cover shoulders being disposed within an embossed socket having at the opposite circumferential sides thereof shoulders that oppose the respective adjacent sides of the cover retaining means on the wheel in normally slightly spaced relation but interengageable therewith on tendency of turning of the cover on the wheel to retain the cover against such turning.

References Cited in the file of this patent

UNITED STATES PATENTS

| Re. 21,179 | Lyon | Aug. 22, 1939 |
| 2,183,220 | Horn | Dec. 12, 1939 |
| 2,265,241 | Lyon | Dec. 9, 1941 |
| 2,317,393 | Lyon | Apr. 27, 1943 |
| 2,386,241 | Lyon | Oct. 9, 1945 |
| 2,631,066 | Horn | Mar. 10, 1953 |
| 2,631,895 | Hunt | Mar. 17, 1954 |
| 2,669,487 | Horn | Feb. 16, 1954 |

FOREIGN PATENTS

| 830,302 | Germany | Feb. 4, 1952 |